United States Patent
Zhao et al.

(10) Patent No.: US 11,190,938 B2
(45) Date of Patent: Nov. 30, 2021

(54) DEVICE IDENTIFIER ACCESS METHOD AND APPARATUS

(71) Applicant: Huawei Technologies Co., Ltd., Shenzhen (CN)

(72) Inventors: Kao Zhao, Shenzhen (CN); Zhen Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 16/651,785

(22) PCT Filed: Sep. 29, 2017

(86) PCT No.: PCT/CN2017/104624
§ 371 (c)(1),
(2) Date: Mar. 27, 2020

(87) PCT Pub. No.: WO2019/061362
PCT Pub. Date: Apr. 4, 2019

(65) Prior Publication Data
US 2020/0245150 A1    Jul. 30, 2020

(51) Int. Cl.
*H04W 12/08* (2021.01)
*H04W 12/02* (2009.01)
*H04W 12/40* (2021.01)

(52) U.S. Cl.
CPC .......... *H04W 12/08* (2013.01); *H04W 12/02* (2013.01); *H04W 12/40* (2021.01)

(58) Field of Classification Search
CPC .............................. H04W 12/08; H04W 12/02
See application file for complete search history.

(56) References Cited

U.S. PATENT DOCUMENTS

| | | | |
|---|---|---|---|
| 2004/0266395 A1* | 12/2004 | Pailles | H04W 12/35 455/411 |
| 2013/0324082 A1 | 12/2013 | Mohajeri | |
| 2014/0099920 A1 | 4/2014 | Belanger et al. | |
| 2015/0106871 A1 | 4/2015 | Lim | |

(Continued)

FOREIGN PATENT DOCUMENTS

| | | | |
|---|---|---|---|
| CN | 105205388 A | 12/2015 | |
| CN | 105512545 A | 4/2016 | |

(Continued)

*Primary Examiner* — Ponnoreay Pich
(74) *Attorney, Agent, or Firm* — Slater Matsil, LLP

(57) ABSTRACT

Embodiments of the application provide a device identifier access method and relate to the field of communications technologies, so as to reduce a risk of privacy leakage, and improve device security of a terminal. The method implemented by a terminal, includes: receiving request information for accessing a first device identifier by a target application; determining first access permission used when the target application accesses the first device identifier, where the first access permission includes one of the following: prohibiting access to the first device identifier, allowing access to a real value of the first device identifier, and allowing access to a dummy value of the first device identifier; and when the first access permission is allowing access to the dummy value of the first device identifier, returning the dummy value of the first device identifier to the target application.

17 Claims, 12 Drawing Sheets

(56) References Cited

U.S. PATENT DOCUMENTS

2015/0207797 A1    7/2015  Wuthnow et al.
2016/0241559 A1*  8/2016  Trani ................. G07C 9/00309
2016/0323283 A1*  11/2016  Kang .................... H04L 63/105
2020/0245150 A1*  7/2020  Zhao ..................... H04W 12/08

FOREIGN PATENT DOCUMENTS

| | | |
|---|---|---|
| CN | 106330958 A | 1/2017 |
| GN | 103116716 A | 5/2013 |
| GN | 103530568 A | 1/2014 |
| WO | 2015054291 A1 | 4/2015 |
| WO | 2015061644 A1 | 4/2015 |

\* cited by examiner

|  | MEID | SN | MAC address |
|---|---|---|---|
| Application A | √ | ○ | ○ |
| Application B | ○ | ○ | ○ |
| Application C | - | - | - |

√ : Allow to access a real value
○ : Allow to access a dummy value
- : Prohibit access

FIG. 10

|  | MEID | SN | MAC address |
|---|---|---|---|
| Instant messaging application | √ | ○ | ○ |
| Shopping application | ○ | ○ | ○ |
| Game application | - | - | - |

√ : Allow to access a real value
○ : Allow to access a dummy value
- : Prohibit access

FIG. 11

DEVICE IDENTIFIER ACCESS METHOD AND APPARATUS

CROSS-REFERENCE TO RELATED APPLICATIONS

This application is a national stage of International Application No. PCT/CN2017/104624, filed on Sep. 29, 2017, which is hereby incorporated by reference in its entirety.

TECHNICAL FIELD

Embodiments of this application relate to the field of communications technologies, and in particular, to a device identifier access method and an apparatus.

BACKGROUND

A device identifier is a character string used to uniquely identify a device. Common device identifiers include an international mobile equipment identity (IMEI), an international mobile subscriber identity (IMSI), a mobile equipment identifier (MEID), a serial number (SN), an integrated circuit card identifier (ICCID), a media access control layer (MAC) address, and the like.

All of these device identifiers are usually directly associated with related information of a user, for example, basic information of a user, such as a name, a phone number, and an address of a natural person owning the terminal may be found by using an IMEI number of a terminal. In this case, if an application program (app for short below) installed on the terminal accesses these device identifiers at will, a risk of user privacy leakage is caused, and device security of the terminal is compromised.

SUMMARY

Embodiments of this application provide a device identifier access method and an apparatus, to reduce a risk of privacy leakage caused by excessive access to a device identifier by an application program, and improve device security of a terminal.

To achieve the foregoing objectives, the following technical solutions are used in the embodiments of this application.

According to a first aspect, an embodiment of this application provides a device identifier access method, including: receiving, by a terminal, request information for accessing a first device identifier by a target application; in response to the request information, determining, by the terminal, whether first access permission for the target application to access the first device identifier is stored; if the terminal determines that the first access permission is not stored, sending, by the terminal, permission query request information to a permission management server by using a wireless network (the permission query request information includes an identifier of the target application); after the permission management server receives the permission query request information, further determining whether device identifier access permission information of the target application is stored, where the device identifier access permission information includes the first access permission used when the target application accesses the first device identifier and second access permission used when the target application accesses a second device identifier; if the permission management server determines that the device identifier access permission information of the target application is not stored, sending, by the permission management server, application type request information to an application server, where the application type request information includes the identifier of the target application; after the application server receives the application type request information, sending an application type corresponding to the target application to the permission management server; using, by the permission management server based on the application type, device identifier access permission information of a candidate application that has the same application type as the target application as the device identifier access permission information of the target application; sending the device identifier access permission information of the target application to the terminal; and when the first access permission in the device identifier access permission information is allowing access to a dummy value of the first device identifier, returning, by the terminal, the dummy value of the first device identifier to the target application, where the dummy value of the first device identifier is obtained after anonymization processing is performed on a real value of the first device identifier.

To be specific, in this application, corresponding device identifier access permission may be set for different applications. A device identifier that does not affect normal running of an application is provided for the application in a form of a dummy value, and a real value of the device identifier is hidden from the application, so that proper control is performed on the device identifier, thereby avoiding a risk of user privacy leakage and lower device security that are caused by excessive access to the device identifier by the application.

In a possible design method, before the using, by the permission management server, device identifier access permission information of a candidate application that has the same application type as the target application as the device identifier access permission information of the target application, the method further includes: receiving, by the permission management server, behavior data that is sent by the terminal and that is obtained when a user uses the target application; and after the using, by the permission management server based on the application type, device identifier access permission information of a candidate application that has the same application type as the target application as the device identifier access permission information of the target application, the method further includes: modifying, by the permission management server, device identifier access permission of the target application based on the behavior data, to obtain device identifier access permission corresponding to a user behavior.

In this way, based on behavior data reported by the terminal, the permission management server may set, for each application on different terminals, device identifier access permission corresponding to a user behavior reported by the terminal, so as to minimize, based on a usage habit of the user, a privacy risk caused by excessive access to the device identifier by an application, and improve device security of the terminal.

In a possible design method, the device identifier includes at least one of an IMEI, an IMSI, an MEID, an SN, a MAC address, a phone number, and an application account.

According to a second aspect, an embodiment of this application provides a device identifier access system, including a permission management server and a terminal connected to the permission management server by using a wireless network. At least one application is installed on the terminal. The terminal is configured to: when a request for applying for accessing a first device identifier by a target application is received, determine whether first access permission for the target application to access the first device identifier is stored in the terminal; and if the first access permission is not stored, send permission query request information to the permission management server, where the permission query request information includes an identifier of the target application. The permission management server is configured to: after receiving the permission query request information sent by the terminal, determine device identifier access permission information of the target application based on the identifier of the target application (the device identifier access permission information includes: the first access permission used when the target application accesses the first device identifier and second access permission used when the target application accesses a second device identifier); and send query response information that includes the device identifier access permission information of the target application to the terminal. In this case, the terminal is further configured to: receive the query response information sent by the permission management server; and when the first access permission in the device identifier access permission information is allowing access to a dummy value of the first device identifier, return the dummy value of the first device identifier to the target application, where the dummy value of the first device identifier is obtained after anonymization processing is performed on a real value of the first device identifier.

In a possible design method, that the terminal returns the dummy value of the first device identifier to the target application includes: performing, by the terminal, anonymization processing on the real value of the first device identifier by using a randomized algorithm or a generalization algorithm, to obtain the dummy value of the first device identifier; and returning, by the terminal, the obtained dummy value of the first device identifier to the target application.

Because the dummy value of the first device identifier obtained by the target application is not directly associated with related information of a user, a risk of privacy leakage caused by access to the device identifier by an application can be reduced, and device security of the terminal can be improved.

In a possible design method, that the permission management server determines the device identifier access permission information of the target application based on the identifier of the target application includes: querying, by the permission management server based on the identifier of the target application, whether the permission management server stores the device identifier access permission information of the target application; and if the device identifier access permission information of the target application is not stored, setting, by the permission management server, the device identifier access permission information of the target application based on a type of the target application.

In a possible design method, the system further includes an operation server that is connected to the permission management server and that is of an application market; and the setting, by the permission management server, the device identifier access permission information of the target application based on a type of the target application includes: obtaining, by the permission management server, the type of the target application from the operation server; and setting, by the permission management server, device identifier access permission information of an application that is on the permission management server and has a same type as the target application, to the device identifier access permission information of the target application. Usage of applications of a same type is similar when a device identifier is accessed. Therefore, corresponding device identifier access permission information may be quickly determined for the target application based on the type of the target application, so as to accelerate access to the device identifier.

In a possible design method, the permission management server is further configured to: receive behavior data that is reported by the terminal and obtained when a user uses the target application; and set, for the terminal based on the behavior data obtained when the target application is used, device identifier access permission information that is of the target application and that conforms to a user behavior.

In a possible design method, the device identifier includes a low-risk device identifier and a high-risk device identifier, and interference generated by the low-risk device identifier when the target application runs is less than interference generated by the high-risk device identifier when the target application runs; and access permission of the low-risk device identifier is accessing a dummy value of the low-risk device identifier; and access permission of the high-risk device identifier is accessing a real value of the low-risk device identifier.

To be specific, the access permission may provide, for an application without affecting normal running of the application, a real value of a device identifier that needs to be used when the application runs normally. When a device identifier requested by the application for access does not affect normal running of the application, a dummy value of the device identifier may be returned to the application, so as to minimize a privacy risk caused by excessive access of the device identifier by the application and improve device security of the terminal.

According to a third aspect, an embodiment of this application provides a device identifier access method, including: receiving, by the terminal, request information for accessing a first device identifier by a target application; in response to the request information, determining, by the terminal, first access permission used when the target application accesses the first device identifier, where the first access permission includes one of the following: prohibiting access to the first device identifier, allowing access to a real value of the first device identifier, and allowing access to a dummy value of the first device identifier; and when the first access permission is allowing access to the dummy value of the first device identifier, returning, by the terminal, the dummy value of the first device identifier to the target application, where the dummy value of the first device identifier is obtained after anonymization processing is performed on the real value of the first device identifier.

In a possible design method, the determining, by the terminal, first access permission used when the target application accesses the first device identifier includes: using, by the terminal based on a name of the target application, access permission corresponding to the name of the target application in the terminal as the first access permission used when the target application accesses the first device identifier. To be specific, corresponding device identifier access permission is set for each different application on a per-application basis, so as to improve device security.

In a possible design method, the determining, by the terminal, first access permission used when the target application accesses the first device identifier includes: using, by the terminal based on a type of the target application, access permission corresponding to the type of the target application in the terminal as the first access permission used when the target application accesses the first device identifier. To be specific, corresponding device identifier access permission is set for different types of applications based on a same type of applications, so as to improve device security.

In a possible design method, the returning, by the terminal, the dummy value of the first device identifier to the target application includes: querying, by the terminal, whether the dummy value of the first device identifier is stored; and if the dummy value of the first device identifier is stored, returning, by the terminal, the stored dummy value of the first device identifier to the target application.

In a possible design method, after querying, by the terminal, whether the dummy value of the first device identifier is stored, the method further includes: if the dummy value of the device identifier is not stored, performing, by the terminal, anonymization processing on the real value of the first device identifier by using a randomized algorithm or a generalization algorithm, to obtain the dummy value of the first device identifier; and returning, by the terminal, the obtained dummy value of the first device identifier to the target application.

The terminal may alternatively store the obtained dummy value of the device identifier in the terminal. In this way, when the target application or another application subsequently needs to access the dummy value of the device identifier, the terminal may quickly return the obtained dummy value of the device identifier to a corresponding application, so as to accelerate access to the device identifier.

In a possible design method, before the receiving, by the terminal, request information for accessing a first device identifier by a target application, the method further includes: sending, by the terminal, permission query request information to a permission management server by using a wireless network, where the permission query request information includes an identifier of the target application; and receiving, by the terminal, query response information sent by the permission management server, where the query response information includes device identifier access permission information of the target application, and the device identifier access permission information includes the first access permission used when the target application accesses the first device identifier and second access permission used when the target application accesses a second device identifier. The device identifier access permission information is obtained in advance. Subsequently, when the target application requests to access a corresponding device identifier, the terminal may return a real value or a dummy value of the device identifier to the target application in a timely manner based on device identifier access permission stored in the terminal without obtaining the device identifier access permission from the permission management server.

In a possible design method, the determining, by the terminal, first access permission used when the target application accesses the first device identifier includes: using, by the terminal, access permission used when a candidate application accesses the first device identifier as the first access permission used when the target application accesses the first device identifier, where a type of the candidate application is the same as the type of the target application.

In a possible design method, the device identifier includes at least one of an IMEI, an IMSI, an MEID, an SN, and a MAC address; and/or the terminal stores the dummy value of the first device identifier; and/or when detecting that the target application invokes a preset identifier access function, the terminal determines to receive the request information for accessing the first device identifier by the target application.

According to a fourth aspect, an embodiment of this application provides a terminal, including: an application request unit, configured to receive request information for accessing a first device identifier by a target application; an intelligent configuration unit, configured to determine first access permission used when the target application accesses the first device identifier, where the first access permission includes one of the following: prohibiting access to the first device identifier, allowing access to a real value of the first device identifier, and allowing access to a dummy value of the first device identifier; and an output unit, configured to: when the first access permission is allowing access to the dummy value of the first device identifier, return the dummy value of the first device identifier to the target application, where the dummy value of the first device identifier is obtained after anonymization processing is performed on the real value of the first device identifier.

In a possible design method, the intelligent configuration unit is specifically configured to use, based on a name of the target application, access permission corresponding to the name of the target application in the terminal as the first access permission used when the target application accesses the first device identifier.

In a possible design method, the intelligent configuration unit is specifically configured to use, based on a type of the target application, access permission corresponding to the type of the target application in the terminal as the first access permission used when the target application accesses the first device identifier.

In a possible design method, the output unit is specifically configured to: query whether the dummy value of the first device identifier is stored; and if the dummy value of the first device identifier is stored, return the stored dummy value of the first device identifier to the target application.

In a possible design method, the terminal further includes an identifier processing unit; the identifier processing unit is configured to: if the dummy value of the device identifier is not stored, perform anonymization processing on the real value of the first device identifier by using a randomized algorithm or a generalization algorithm, to obtain the dummy value of the first device identifier; and the output unit is further configured to return the obtained dummy value of the first device identifier to the target application.

In a possible design method, the terminal further includes a communications unit, configured to send permission query request information to a permission management server by using a wireless network, where the permission query request information includes an identifier of the target application; and receive query response information sent by the permission management server, where the query response information includes device identifier access permission information of the target application, and the device identifier access permission information includes the first access permission used when the target application accesses the first device identifier and second access permission used when the target application accesses a second device identifier.

In a possible design method, the intelligent configuration unit is specifically configured to use access permission used when a candidate application accesses the first device identifier as the first access permission used when the target application accesses the first device identifier, where a type of the candidate application is the same as the type of the target application.

In a possible design method, the application request unit is specifically configured to: when detecting that the target application invokes a preset identifier access function, determine to receive request information for accessing the first device identifier by the target application; and/or the intelligent configuration unit is further configured to store the dummy value of the first device identifier, where the device identifier includes at least one of an IMEI, an IMSI, an MEID, an SN, and a MAC address.

According to a fifth aspect, an embodiment of this application provides a terminal, including a processor, a memory, a bus, and a communications interface. The memory is configured to store a computer executable instruction. The processor is connected to the memory by using the bus. When the terminal runs, the processor executes the computer executable instruction stored in the memory and the terminal is enabled to perform any one of the foregoing device identifier access methods.

According to a sixth aspect, an embodiment of this application provides a computer readable storage medium. The computer readable storage medium stores an instruction. When the instruction runs on any one of the foregoing terminals, the terminal is enabled to perform any one of the foregoing device identifier access methods.

According to a seventh aspect, an embodiment of this application provides a computer program product including an instruction. When the computer program product runs on any one of the foregoing terminals, the terminal is enabled to perform any one of the foregoing device identifier access methods.

BRIEF DESCRIPTION OF THE DRAWINGS

FIG. 10 is a schematic diagram 4 of an application scenario of a device identifier access method according to an embodiment of this application;

FIG. 11 is a schematic diagram 5 of an application scenario of a device identifier access method according to an embodiment of this application;

DETAILED DESCRIPTION OF ILLUSTRATIVE EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "a plurality of" means two or more than two.

Figure 1:
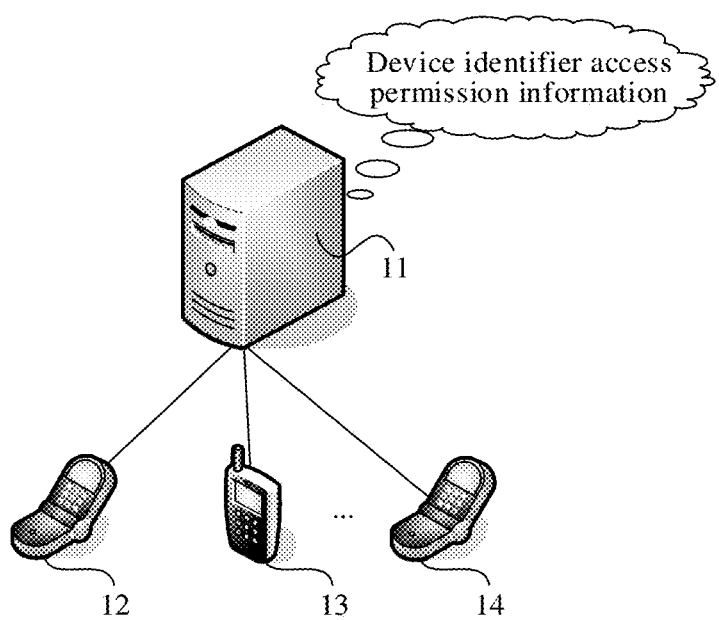
FIG. 1 is an architectural diagram 1 of a device identifier access system according to an embodiment of this application.

A device identifier access method provided in the embodiments of this application may be applied to a device identifier access system shown in FIG. 1. As shown in FIG. 1, the system includes a permission management server 11 and at least one terminal connected to the permission management server 11, for example, a terminal 12, a terminal 13, and a terminal 14 shown in FIG. 1.

The permission management server 11 stores device identifier access permission information of at least one application. Device identifier access permission information of an application specifically includes an identifier of the application and access permission used when the application accesses at least two different device identifiers.

Device identifier access permission information of an application A is used as an example. The device identifier access permission information of the application A includes a package name of the application A, first access permission used when the application A accesses a first device identifier, and second access permission used when the application A accesses a second device identifier. The first access permission is specifically used to indicate whether the terminal allows the application A to access the first device identifier when the application A requests to access the first device identifier of the terminal, or whether the first device identifier provided by the terminal for the application A is a real value or a dummy value when the application A is allowed to access the first device identifier. Similarly, the second access permission is specifically used to indicate whether the terminal allows the application A to access the second device identifier when the application A requests to access the second device identifier of the terminal, or whether the second device identifier provided by the terminal for the application A is a real value or a dummy value when the application A is allowed to access the second device identifier.

For example, the device identifier may specifically include an IMEI, an IMSI, an MEID, an SN, a MAC address, a phone number, and the like of the terminal.

The IMEI is an electronic serial number consisting of 15 digits, and is in a one-to-one correspondence with each terminal. The electronic serial number is unique worldwide. After being assembled, each terminal is assigned a globally unique group of numbers. The numbers are recorded by a manufacturer from production to delivery. An IMEI code may be used to identify a terminal, track a geographic location, and record a user behavior such as dialing, sending an SMS message, and accessing the Internet.

The IMSI can be stored in a SIM card and is used to identify valid information of a mobile subscriber. A total length of the IMSI does not exceed 15 digits, and consists of a mobile country code (mobile country code, MCC), a mobile network code (mobile network code, MNC), and a mobile subscriber identification number (mobile subscriber identification number, MSIN). The MCC is a code of a country to which a mobile subscriber belongs, and occupies three digits. The MNC is a mobile network code, consists of a maximum of two digits, and is used to identify a mobile communications network to which a mobile subscriber belongs. The MSIN is a mobile subscriber identification number, used to identify a mobile subscriber in a mobile communications network.

The MEID is an identification number of a code division multiple access (code division multiple access, CDMA) terminal, and is also an identifier used to identify different CDMA terminals (for example, a CDMA mobile phone or a tablet computer). A base station or server on a network side can trace and monitor the CDMA terminal by using the identifier.

The SN is a serial number of a terminal, and is also referred to as a machine code sometimes. To prevent some software from being pirated, specified protection measures are taken. During user registration, a unique identifier (namely, an SN) is generated based on computer software and hardware information installed in user software, so as to prevent user software from being stolen.

The MAC address is determined by a network interface card. For a terminal (for example, a tablet computer) that does not have an IMSI, a location of the terminal can be traced by using a MAC address of the terminal.

The phone number, such as a mobile phone number, may also be referred to as a mobile directory number (mobile directory number, MDN), in other words, a number that a calling user needs to dial when a user is a called party. An operator may store the mobile phone number in a SIM card. The Android system is used as an example. A terminal may invoke a corresponding function by using a telephony service (TELEPHONY_SERVICE) in a system service, for example, a getLine1Number( ) function, to obtain a mobile phone number in a SIM card.

It should be noted that the device identifier in this embodiment of this application may be an identifier related to terminal hardware, for example, an IMEI, an IMSI, an MEID, an SN, and a MAC address, or may be an identifier obtained by a terminal at a software level, for example, a global unique identifier (global unique identifier, GUID), a universally unique identifier (universally unique identifier, UUID), an instance identifier (Instance ID), and an Android identifier (Android ID). A specific form of the device identifier is not limited in this embodiment of this application.

It may be understood that, in some other embodiments of this application, the foregoing device identifier may alternatively be another identifier that may identify a terminal and is associated with user information, for example, an account used by a user to log in to an application.

All of these device identifiers are associated with related information of a user, for example, related information of a user, such as a name, a phone number, and an address of the user owning the terminal may be found by using an IMEI number of the terminal. Therefore, if an application can access these device identifiers (for example, an IMEI number) in the terminal at will, device security of the terminal is compromised.

To resolve the technical problem that device security is compromised when the application accesses these device identifiers at will, with reference to FIG. 1, an embodiment of this application provides a device identifier access method. As described in FIG. 2, the method may specifically include the following steps.

Step S301: A terminal receives a request of a target application for applying for accessing a first device identifier.

During running, each application installed on the terminal can access a device identifier such as an IMEI, an IMSI, an MEID, an SN, and a MAC address by invoking a related identifier access function. For example, an application A may request to access the MEID by invoking a getMeid( ) function at a framework layer, and a return value of the function is a specific value of the MEID. In this case, when the terminal detects that the target application invokes the getMeid( ) function, it is considered that the terminal receives the request for applying for accessing the MEID (namely, the first device identifier) corresponding to the getMeid( ) function.

Step S302: The terminal determines first access permission used when the target application accesses the first device identifier.

In some embodiments of this application, the terminal may first search a memory of the terminal to determine whether the first access permission used when the target application accesses the first device identifier is stored.

Specifically, the permission management server 11 may set and store corresponding device identifier access permission information for one or more applications, and may deliver the device identifier access permission information to the terminal under special circumstances by using a wireless network. In this way, after receiving device identifier access permission information of an application, the terminal may store the information in the memory. When a request for applying for accessing a device identifier (for example, the first device identifier) by the target application is received, the terminal may search downloaded device identifier access permission information in the memory of the terminal to determine whether the first access permission corresponding to the target application and the first device identifier is stored.

Specifically, for a low-risk device identifier that does not affect normal running of an application, for example, for a photographing application, whether to obtain a real value of an IMEI, an IMSI, an MEID, an SN, or a MAC address does not cause an exception in running of the application. In this case, the permission management server 11 may set device identifier access permission used when this type of application accesses the IMEI, the IMSI, the MEID, the SN, or the MAC address to accessing a dummy value. In this way, when these applications request access to the device identifier from the terminal, the terminal may hide a real value of the device identifier from the application, and provide a dummy value of the device identifier to the application, so as to prevent the application from using a real device identifier to obtain user privacy. This implements proper control over the device identifier, and avoids a risk of user privacy leakage and lower device security caused by excessive access to the device identifier by the application.

For a high-risk device identifier that affects normal running of an application, for example, for a payment application such as Alipay, for payment security, this type of application usually needs to perform authentication on user identity based on an IMEI, otherwise payment cannot be completed. In this case, the permission management server 11 may set device identifier access permission used when this type of application accesses the IMEI to accessing a real value, and set device identifier access permission used when this type of application accesses the IMSI, the MEID, the SN, and the MAC address to accessing a dummy value, so as to ensure that the application can run normally while device security is improved.

When the terminal determines that first access permission information used when the target application accesses the first device identifier is not stored, the terminal may continue to perform step S303 below.

Step S303: The terminal sends permission query request information to the permission management server 11 by using a wireless network, where the permission query request information includes an identifier of the target application.

If the terminal does not find, in the memory, the access permission information used when the target application accesses the device identifier, it indicates that the terminal does not download, from the permission management server 11, the device identifier access permission information corresponding to the target application. Therefore, to ensure normal running of the target application and reduce a device security risk caused when the target application accesses the device identifier, the terminal may send the permission query request information to the permission management server 11, in other words, request the permission management server 11 to provide the terminal with the device identifier access permission information of the target application.

The permission query request information may carry the identifier of the target application, for example, a package name of the target application. In addition, to facilitate the permission management server 11 to identify the terminal that sends the permission query request information, the permission query request information may further carry an identifier of the terminal, so that after finding the device identifier access permission information of the target application, the permission management server 11 sends determined device identifier access permission to a corresponding terminal based on the identifier of the terminal.

Certainly, in addition to the package name of the target application, another parameter that can uniquely identify the target application, such as a name and a version number of the target application, may be used as the identifier of the target application.

For example, the terminal may send the permission query request information to the permission management server 11 by using a wireless network in a form of Wi-Fi, Bluetooth, a mobile cellular network, or the like.

Step S304: After receiving the permission query request information, the permission management server 11 may determine, based on the identifier of the target application, device identifier access permission information corresponding to the target application.

Specifically, after receiving the permission query request information, the permission management server 11 may query, based on the identifier of the target application carried in the permission query request information, the permission management server 11 to determine whether the device identifier access permission information of the target application is stored. If the device identifier access permission information of the target application is stored, the permission management server 11 may continue to perform steps S305 and S306 below. If the device identifier access permission information of the target application is not stored, the permission management server 11 may set, based on a type of the target application, device identifier access permission information corresponding to the type of the target application.

Figure 3:
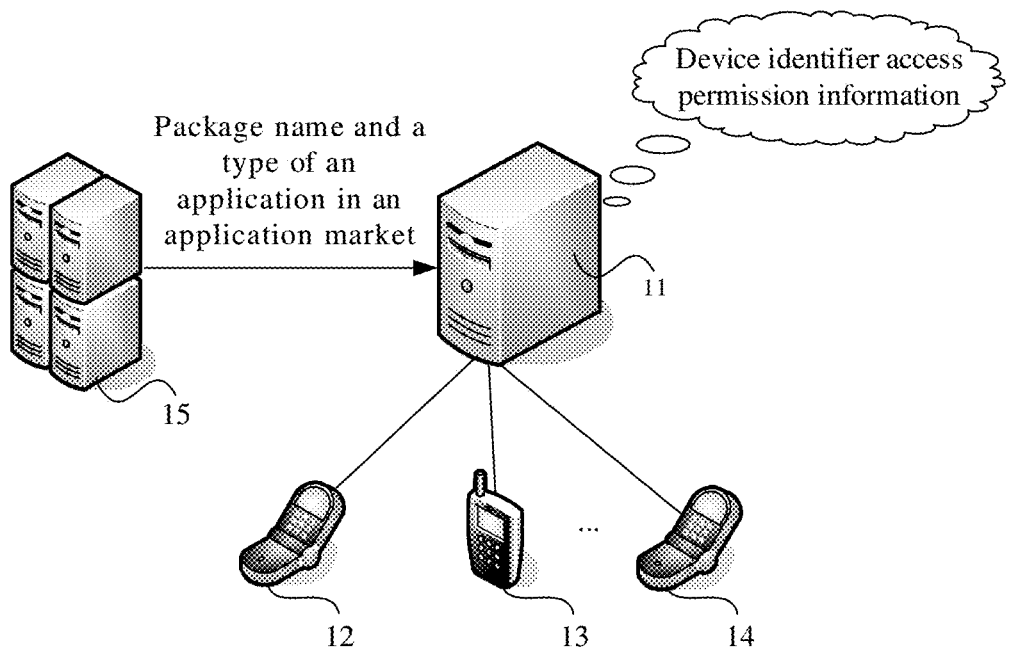
FIG. 3 is an architectural diagram 2 of a device identifier access system according to an embodiment of this application.

For example, as shown in FIG. 3, the permission management server 11 may further be connected to an operation server 15 of an application market. In this way, the permission management server 11 may obtain a type of each application, such as a photographing application or a map application, from the operation server 15, and further set, based on the type of each application, device identifier access permission corresponding to the type of each application.

For example, the permission query request information sent by the terminal to the permission management server 11 carries a package name of WeChat. In this case, the permission management server 11 may search a memory of the permission management server 11 to determine whether device identifier access permission information corresponding to the package name of WeChat is stored. If the device identifier access permission information is not found, the permission management server 11 may send a request including the package name of WeChat to the operation server 15. After receiving the request, the operation server 15 may determine, based on the package name of WeChat, that a type of WeChat is an instant messaging application in the application market. In this case, the operation server 15 may carry the type of WeChat: instant messaging application in response information and send the response information to the permission management server 11. Further, the permission management server 11 may search the memory of the permission management server 11 for device identifier access permission information of an existing instant messaging application (for example, QQ), and set the device identifier access permission information of QQ to the device identifier access permission information of WeChat.

In some embodiments of this application, when the application market releases a new application (for example, an application B), the operation server 15 may send related information of the application B, such as an application name and an application type, to the permission management server 11. Further, the permission management server 11 may use, based on a type of the application B, device identifier access permission of an application whose type is the same as or similar to the type of the application B as device identifier access permission of the application B.

For example, when the operation server 15 releases, in the application market, a new application whose application name is Taobao and whose application type is a shopping application, the operation server 15 may send information such as a package name and the application type of Taobao to the permission management server 11. Further, the permission management server 11 may search the memory of the permission management server 11 for device identifier access permission information of another existing shopping application, and set the device identifier access permission information of the found another shopping application to device identifier access permission information of Taobao. In this way, when subsequently receiving permission query request information sent by the terminal for the Taobao application, the permission management server 11 may feed the device identifier access permission information of Taobao in the memory of the permission management server 11 back to the terminal in time.

Alternatively, if no device identifier access permission of the shopping application is set in the permission management server 11, the permission management server 11 may set default initial access permission for the application B.

For example, the initial access permission is that a dummy value is returned when the application B accesses all device identifiers. Further, the permission management server 11 may perform machine learning and analysis with reference to data in the application market and data in a big data platform, and gradually correct the initial access permission, to finally obtain device identifier access permission suitable for the application B.

For example, when the device identifier includes the IMEI, the SN, and the MAC address, for the application B whose device identifier access permission is not set, the permission management server 11 may set the initial access permission for accessing the device identifier by the application B as follows: returning a dummy value of the device identifier. Then, the permission management server 11 may detect whether a running exception occurs in the application B when dummy values of the IMEI, the SN, and the MAC address are returned during running of the application B. If no running exception occurs, the initial access permission for the application B to access the IMEI, the SN, and the MAC address may be determined as returning the dummy value of the device identifier. If a running exception occurs, the permission management server 11 may return a real value of one device identifier in the IMEI, the SN, and the MAC address to the application B by using a permutations and combinations method, and detect whether the running exception occurs in the application B. If the running exception persists, the permission management server 11 may continue to return real values of two device identifiers in the IMEI, the SN, and the MAC address to the application B by using the permutations and combinations method, and detect whether the running exception occurs in the application B until the application B runs normally. Access permission used for a test can be used as final device identifier access permission information of the application B.

Certainly, in a process of using and maintaining device identifier access permission information corresponding to each application, the permission management server 11 may update the device identifier access permission information of the application through machine learning or based on a user behavior reported by the terminal. This is not limited in this embodiment of this application.

In addition, in some other embodiments of this application, the permission management server and the permission management server 11 may be two different network entities that run independently, or may be integrated into one network entity. This is not limited in this embodiment of this application.

In this case, by using step S304, the permission management server 11 may determine, based on the identifier of the target application in the permission query request information, the device identifier access permission corresponding to the target application. For example, access permission for the target application to access the IMEI, the SN, and the MAC address is returning a dummy value of a device identifier, and access permission for the target application to access the IMSI is returning a real value of the device identifier.

Step S305: The permission management server 11 sends query response information to the terminal, where the query response information includes the device identifier access permission information of the target application.

Specifically, in step S305, the permission management server 11 may add the device identifier access permission information of the target application determined in step S304 to the query response information, and further send, based on the terminal identifier carried in the permission query request information sent by the terminal, the query response information to a corresponding terminal, namely, the terminal that sends the permission query request information in step S303, by using the wireless network.

Step S306: After receiving the query response information, the terminal provides a real value or a dummy value of the device identifier to the target application based on the device identifier access permission information carried in the query response information.

For example, the target application is a network call application. In a running process, a real value of an IMEI needs to be used by the target application to identify a home location of a calling party or a called party. Otherwise, the target application cannot implement a call function. In the running process, the target application obtains a MAC address and an SN to mark a terminal in which the target application is located, so that an application permission management server 11 of the target application collects statistics about information such as a dialing habit of a user.

To be specific, the IMEI is a device identifier that needs to be used when the target application runs, and dummy values of the MAC address and the SN provided for the target application do not affect normal running of the target application. In this case, the permission management server 11 may set access permission of a device identifier corresponding to the target application to providing a real value for the target application when the target application is allowed to access the IMEI, and providing the dummy values for the target application when the target application is allowed to access the MAC address and the SN. In addition, the access permission of the device identifier is carried in the query response information and the query response information is sent to the terminal.

Figure 4:
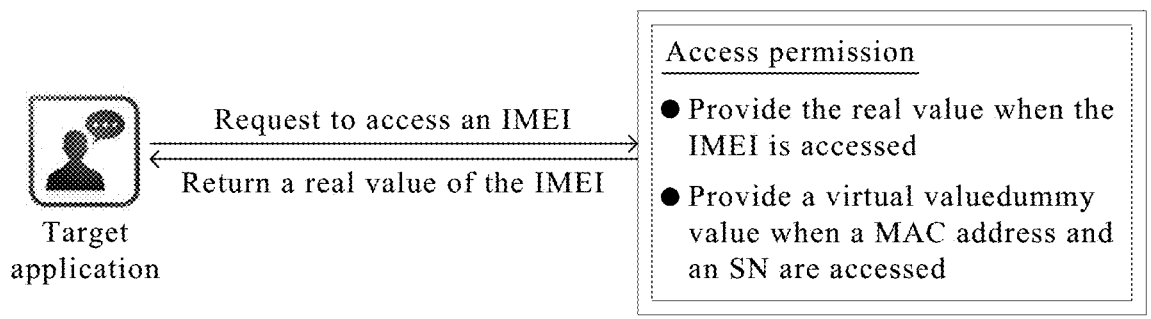
FIG. 4(a) and FIG. 4(b) are a schematic diagram 1 of an application scenario of a device identifier access method according to an embodiment of this application.
Figure 4:
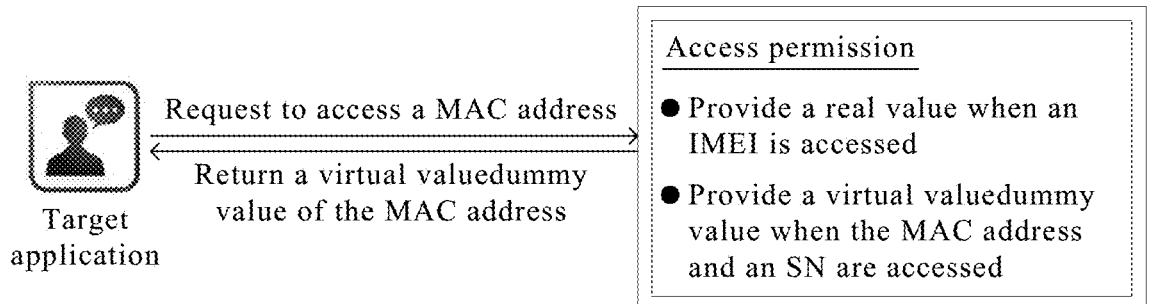

In this way, as shown in FIG. 4(*a*), when the terminal detects that the target application invokes a related interface to request to access the IMEI, the terminal may return the real value of the IMEI to the target application based on the access permission. As shown in FIG. 4(*b*), when the terminal detects that the target application invokes a related interface to request to access the MAC address (or the SN), the terminal may return the dummy value of the MAC address (or the SN) to the target application based on the access permission. A method for setting a device identifier of the terminal to a dummy value is described in detail in the following embodiment. Therefore, details are not described herein again.

To be specific, in this application, corresponding device identifier access permission may be set for different applications. A device identifier that does not affect normal running of an application is provided for the application in a form of a dummy value, and a real value of the device identifier is hidden from the application, so that proper control is performed on the device identifier, thereby avoiding a risk of user privacy leakage and lower device security caused by excessive access to the device identifier by the application.

In addition, in some other embodiments of this application, after receiving the device identifier access permission information corresponding to the target application, the terminal may store the information, so that the terminal does not need to query the permission management server 11 when querying access permission of a related application next time, thereby saving network resources and improving transaction processing efficiency of the terminal.

Further, in some embodiments of this application, for a same application or a same type of application, the permission management server 11 may further collect behavior data of a user on each terminal, and send, to the terminal, device identifier access permission that conforms to a user behavior.

Figure 5:
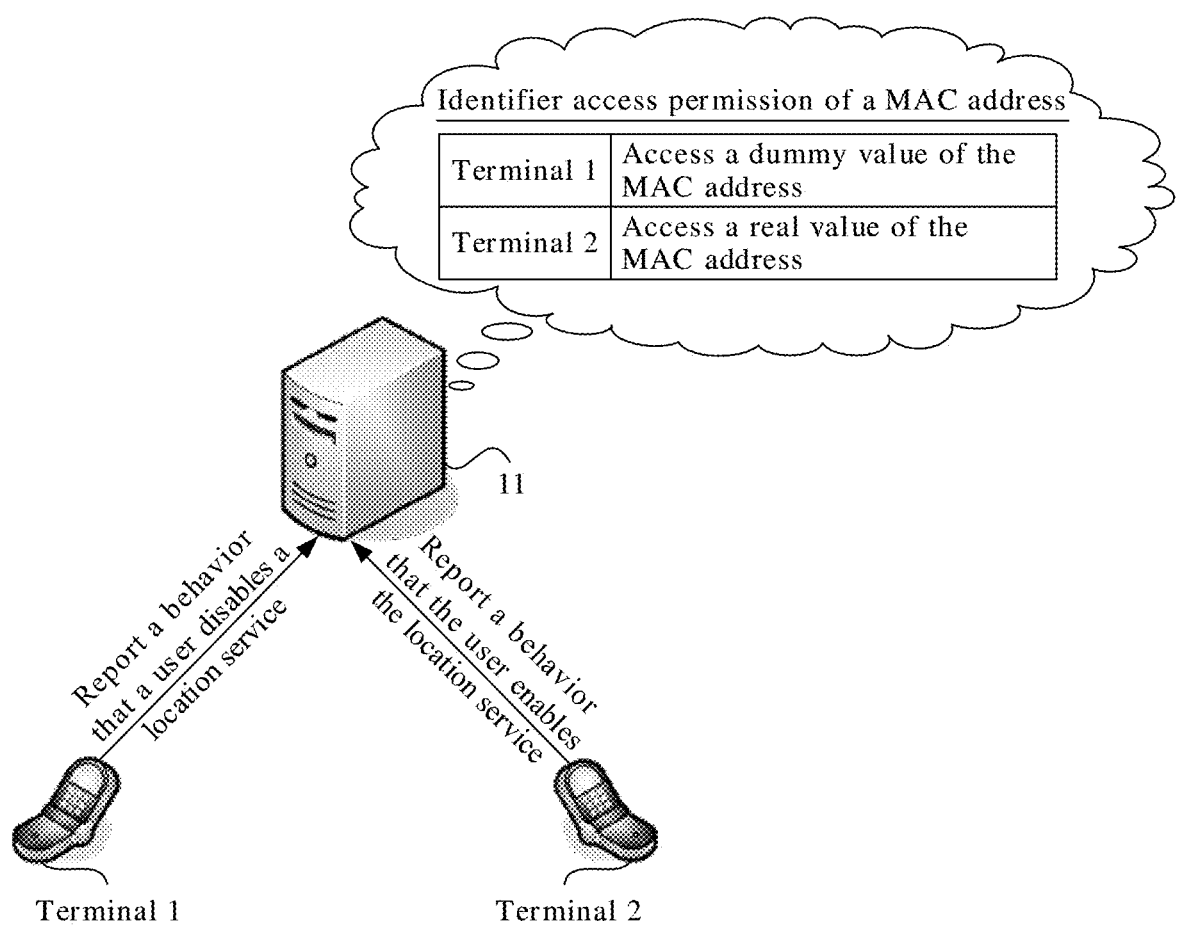
FIG. 5 is a schematic diagram 2 of an application scenario of a device identifier access method according to an embodiment of this application.

For example, when using a terminal 1, a user A always disables a location service provided by an application a. When using a terminal 2, a user B always enables the location service provided by the application a. As shown in FIG. 5, the terminal 1 may report behavior data of the user A to the permission management server 11, and the terminal 2 may also report behavior data of the user B to the permission management server 11. Therefore, the permission management server 11 may determine, based on the behavior of the user A, that locating does not need to be performed by using a real MAC address when the application a runs on the terminal 1, and may determine, based on the behavior of the user B, that locating needs to be performed by using a real MAC address when the application a runs on the terminal 2.

Therefore, as shown in FIG. 5, the permission management server 11 may set device identifier access permission used when the application a runs on the terminal 1 to allowing the application a to access a dummy value of the MAC address, and the permission management server 11 sets device identifier access permission used when the application a runs on the terminal 2 to allowing the application a to access a real value of the MAC address.

In this way, when each application runs on different terminals, the permission management server 11 may set, for each application based on user behavior data reported by the terminal, device identifier access permission corresponding to a user behavior reported by the terminal, so as to minimize, based on a usage habit of the user, a privacy risk caused by excessive access to the device identifier by an application, and improve device security of the terminal.

The embodiments of this application further provide a device identifier access method. The method may be applied to any terminal such as a mobile phone, a wearable device, an augmented reality (augmented reality, AR)/a virtual reality (virtual reality, VR) device, a tablet computer, a notebook computer, an ultra-mobile personal computer (ultra-mobile personal computer, UMPC), a netbook, and a personal digital assistant (personal digital assistant, PDA). Certainly, a specific form of the terminal is not limited in the following embodiments.

Figure 6:
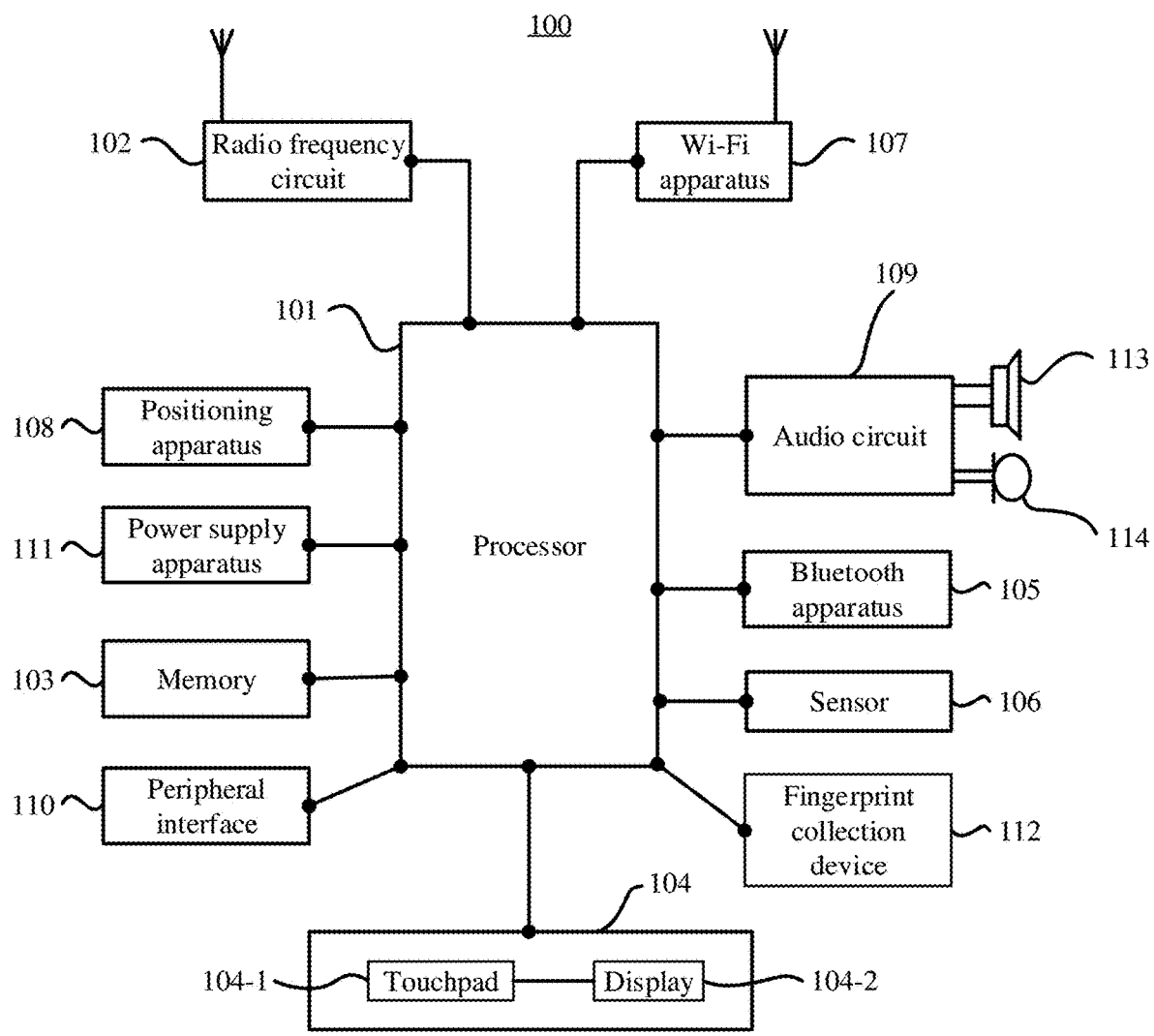
FIG. 6 is a schematic structural diagram 1 of a terminal according to an embodiment of this application.

As shown in FIG. 6, the terminal in the foregoing embodiments may be a mobile phone 100. The mobile phone 100 is used as an example below to describe the embodiment in detail. It should be understood that the mobile phone 100 shown in the figure is merely an example of the terminal, and the mobile phone 100 may have more or fewer components than those shown in the figure and may combine two or more components or have different component configurations.

As shown in FIG. 6, the mobile phone 100 may specifically include components such as a processor 101, a radio frequency (radio frequency, RF) circuit 102, a memory 103, a touchscreen 104, a Bluetooth apparatus 105, one or more sensors 106, a wireless fidelity (wireless fidelity, Wi-Fi) apparatus 107, a positioning apparatus 108, an audio circuit 109, a peripheral interface 110, and a power supply apparatus 111. These components may perform communication by using one or more communications buses or signal cables (not shown in FIG. 6). A person skilled in the art may understand that a hardware structure shown in FIG. 6 does not constitute a limitation on the mobile phone, and the mobile phone 100 may include more or fewer components than those shown in the figure, or may combine some components, or have different component arrangements.

The following describes the components of the mobile phone 100 in detail with reference to FIG. 6.

The processor 101 is a control center of the mobile phone 100. The processor 101 is connected to parts of the mobile phone 100 by using various interfaces and lines, runs or executes an application program stored in the memory 103, and invokes data stored in the memory 103, to perform various functions of the mobile phone 100 and process data. In some embodiments, the processor 101 may include one or more processing units. For example, the processor 101 may be a Kirin 96o chip manufactured by Huawei Technologies Co., Ltd. In some embodiments of this application, the processor 101 may further include a fingerprint verification chip, configured to verify a collected fingerprint.

The radio frequency circuit 102 may be configured to send and receive a radio signal in an information sending and receiving process or in a call process. Specifically, after receiving downlink data from a base station, the radio frequency circuit 102 may send the downlink data to the processor 101 for processing. In addition, the radio frequency circuit 102 sends uplink data to the base station. The radio frequency circuit 102 usually includes but is not limited to an antenna, at least one amplifier, a transceiver, a coupler, a low noise amplifier, a duplexer, and the like. In addition, the radio frequency circuit 102 may further communicate with another device through wireless communication. Any communications standard or protocol may be used for the wireless communication, including but not limited to a global system for mobile communications, a general packet radio service, code division multiple access, wideband code division multiple access, long term evolution, an email, a short message service standards and protocols, and the like.

The memory 103 is configured to store an application program and data. The processor 101 runs the application program and the data stored in the memory 103, to execute various functions of the mobile phone 100 and process data. The memory 103 mainly includes a program storage area and a data storage area. The program storage area may store an operating system, and an application program required by at least one function (for example, a sound playing function or an image playing function). The data storage area may store data (for example, audio data or a phone book) created based on use of the mobile phone 100. In addition, the memory 103 may include a high-speed random access memory (random access memory, RAM), or may include a nonvolatile memory such as a magnetic disk storage device, a flash storage device, or another volatile solid-state storage device. The memory 103 may store various operating systems such as the iOS® operating system developed by Apple and the Android® operating system developed by Google. The memory 103 may be independent, and is connected to the processor 101 by using the communications bus. Alternatively, the memory 103 may be integrated into the processor 101.

The touchscreen 104 may specifically include a touchpad 104-1 and a display 104-2.

The touchpad 104-1 can collect a touch event performed by a user on or near the mobile phone 100 (for example, an operation performed by the user on the touchpad 104-1 or near the touchpad 104-1 by using any suitable object such as a finger or a stylus), and send collected touch information to another component (such as the processor 101). The touch event performed by the user near the touchpad 104-1 may be referred to as a floating touch. The floating touch may mean that the user does not need to directly touch the touchpad for selecting, moving, or dragging an object (for example, an icon), and the user only needs to be near the terminal to execute a desired function. In addition, the touchpad 104-1 may be implemented in a plurality of types such as a resistive type, a capacitive type, an infrared type, or a surface acoustic wave type.

The display (also referred to as a display screen) 104-2 may be configured to display information entered by the user or information provided for the user, and menus of the mobile phone 100. The display 104-2 can be configured in a form of a liquid crystal display, an organic light emitting diode, or the like. The touchpad 104-1 may cover the display 104-2. When detecting a touch event on or near the touchpad 104-1, the touchpad 104-1 transfers the touch event to the processor 101 to determine a type of the touch event. Then, the processor 101 can provide corresponding visual output on the display 104-2 based on the type of the touch event. Although the touchpad 104-1 and the display screen 104-2 in FIG. 6 are used as two independent components to implement input and output functions of the mobile phone 100. In some embodiments, the touchpad 104-1 and the display screen 104-2 may be integrated to implement the input and output functions of the mobile phone 100. It may be understood that the touchscreen 104 is formed by stacking layers of materials. In this embodiment of this application, only the touchpad (layer) and the display screen (layer) are displayed, and another layer is not recorded in this embodiment of this application. In addition, the touchpad 104-1 may be configured on the front of the mobile phone 100 in a full panel form, and the display screen 104-2 may also be configured on the front of the mobile phone 100 in a full panel form. In this way, a bezel-less structure can be implemented on the front face of the mobile phone.

In addition, the mobile phone 100 may further have a fingerprint recognition function. For example, a fingerprint recognizer 112 may be configured on the back of the mobile phone 100 (for example, below a rear-facing camera), or the fingerprint recognizer 112 may be configured on the front of the mobile phone 100 (for example, below the touchscreen 104). For another example, a fingerprint collection device 112 may be disposed on the touchscreen 104 to implement the fingerprint recognition function. In other words, the fingerprint collection device 112 and the touchscreen 104 may be integrated to implement the fingerprint recognition function of the mobile phone 100. In this case, the fingerprint collection device 112 is configured on the touchscreen 104, and may be a part of the touchscreen 104, or may be configured on the touchscreen 104 in another manner. A main component of the fingerprint collection device 112 in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, and the like.

The mobile phone 100 may further include the Bluetooth apparatus 105, configured to exchange data between the short-range mobile phone 100 and another terminal (for example, a mobile phone or a smartwatch). The Bluetooth apparatus 105 in this embodiment of this application may be an integrated circuit, a Bluetooth chip, or the like.

The mobile phone 100 may further include at least one sensor 106, such as an optical sensor, a motion sensor, and another sensor. Specifically, the optical sensor may include an ambient optical sensor and a proximity sensor. The ambient optical sensor may adjust luminance of the display of the touchscreen 104 based on brightness of ambient light, and the proximity sensor may turn off a power supply of the display 104-2 when the mobile phone 100 moves to an ear. As a type of motion sensor, an accelerometer sensor may detect values of acceleration in all directions (usually, three axes), may detect a value and a direction of gravity when the accelerometer sensor is stationary, and may be used for an application identifying a mobile phone posture (for example, screen switching between a landscape mode and a portrait mode, a related game, and magnetometer posture calibration), a function related to vibration recognition (such as a pedometer or a knock), and the like. Other sensors such as a gyroscope, a barometer, a hygrometer, a thermometer, and an infrared sensor may also be disposed on the mobile phone loft Details are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user receive and send an email, browse a web page, access streaming media, and the like. The Wi-Fi apparatus 107 provides a wireless broadband Internet access for the user. In some other embodiments, the Wi-Fi apparatus 107 may also be used as a Wi-Fi wireless access point, and may provide Wi-Fi network access for another terminal.

The positioning apparatus 108 is configured to provide a geographic location for the mobile phone 100. It may be understood that the positioning apparatus 108 may specifically be a receiver of a positioning system such as a global positioning system (global positioning system, GPS), a BeiDou navigation satellite system, or a Russian GLONASS. After receiving the geographic location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (assisted global positioning system, AGPS). The AGPS system serves as an assisted server to assist the positioning apparatus 108 in completing ranging and positioning services. In this case, the assisted positioning server communicates with the positioning apparatus 108 (namely, a GPS receiver) of the terminal, for example, the mobile phone 100, through a wireless communications network, and provides positioning assistance. In some other embodiments, the positioning apparatus 108 may also be a positioning technology based on a Wi-Fi access point. Each Wi-Fi access point has a globally unique media access control (media access control, MAC) address, and the terminal can scan and collect a broadcast signal of a nearby Wi-Fi access point when Wi-Fi is enabled. Therefore, a MAC address broadcast by the Wi-Fi access point can be obtained. The terminal sends such data (for example, the MAC address) that can identify the Wi-Fi access point to a location server through the wireless communications network. The location server retrieves a geographic location of each Wi-Fi access point, calculates a geographic location of the terminal with reference to strength of the Wi-Fi broadcast signal, and sends the geographic location of the terminal to the positioning apparatus 108 of the terminal.

The audio circuit 109, a speaker 113, and a microphone 114 may provide an audio interface between the user and the mobile phone 100. The audio circuit 109 may convert received audio data into an electrical signal and transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, a display externally connected to the mobile phone 100, an external memory, or a subscriber identity module card). For example, the mobile phone 100 is connected to the mouse by using a universal serial bus (universal serial bus, USB) interface, and the mobile phone 100 is connected, by using a metal contact on a card slot of the subscriber identity module card, to the subscriber identity module (subscriber identification module, SIM) card provided by a telecommunications operator. The peripheral interface no may be configured to couple the external input/output peripheral device to the processor 101 and the memory 103.

The mobile phone 100 may further include the power supply apparatus in (for example, a battery or a power supply management chip) that supplies power to the components. The battery may be logically connected to the processor 101 by using the power supply management chip, so that functions such as charging, discharging, and power consumption management are implemented by using the power supply apparatus 111.

Although not shown in FIG. 6, the mobile phone 100 may further include a camera (a front-facing camera and a rear-facing camera), a flash, a micro projection apparatus, a near field communication (near field communication, NFC) apparatus, and the like. Details are not described herein.

Figure 7:
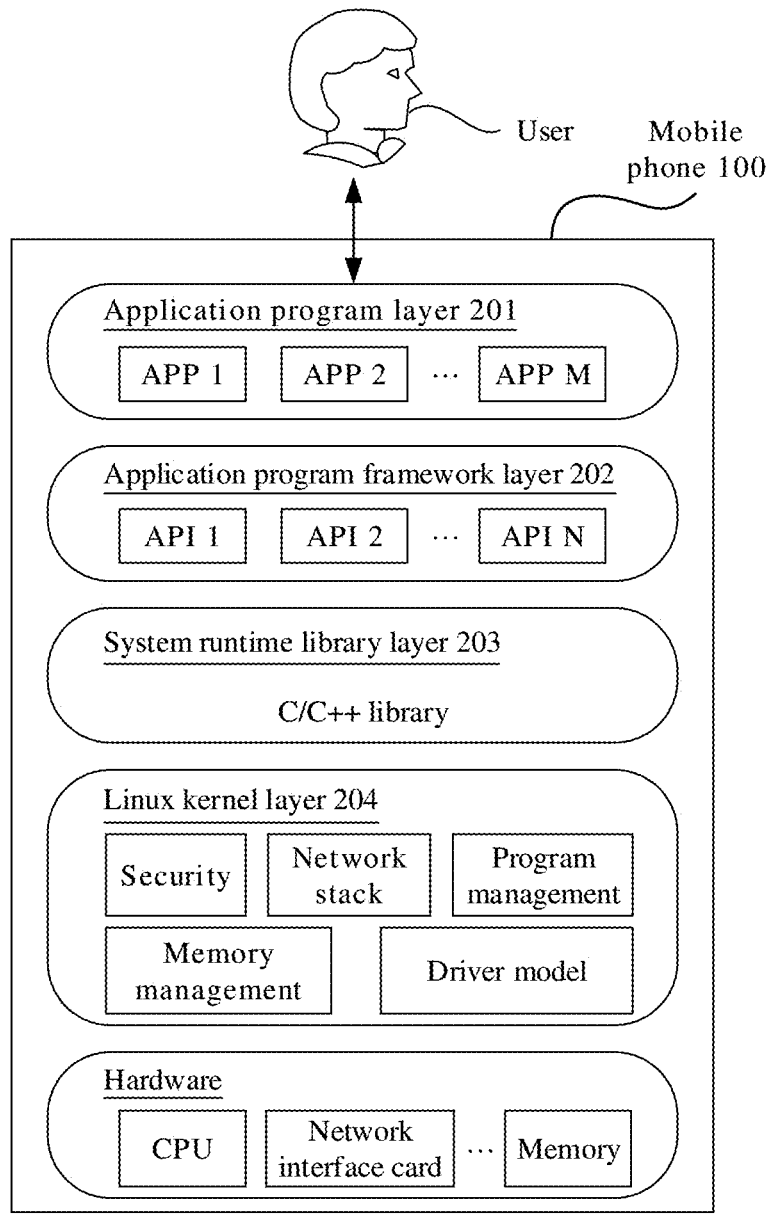
FIG. 7 is a schematic diagram of an architecture of an Android system according to an embodiment of this application.

Further, the mobile phone 100 may run in an operating system such as the Android operating system or the iOS operating system. The Android operating system is used as an example. As shown in FIG. 7, the Android operating system may be divided into four layers: an application program layer 201 (namely, an app layer), an application program framework layer 202 (namely, a framework layer), a system runtime library layer 203 (namely, a libraries layer), and a Linux kernel layer 204 in descending order.

The Linux kernel layer 204 may be configured to control functions such as security, memory management, process management, network stack, and driver model of the mobile phone 100. The Linux kernel layer 204 is also an abstraction layer between hardware (for example, a CPU, a network interface card, and a memory) and a software stack, and may hide specific hardware details, to provide a unified service for upper layers (the system runtime library layer 203, the application program framework layer 202, and the application program layer 201).

The system runtime library layer 203 includes some C/C++ libraries, for example, a media library, a system C library, and a surface manager library. These libraries can be used by different components in the Android system, and the system runtime library layer 203 may provide services for a developer through the framework layer 202.

The framework layer 202 provides the developer with an API framework that can be used for fully accessing an application program. Specifically, the framework layer 202 provides a large quantity of APIs for developing an application program, and an app that meets a related service requirement may be constructed by invoking a corresponding API.

The application program layer 201 mainly includes an app compiled in a java language. When operating on an operation screen of the app, a user interacts, by invoking a related API at the framework layer 202, with the system running library layer 203 or the Linux kernel layer 204, to implement a function corresponding to the operation screen.

A device identifier of hardware such as the network interface card may be stored at the Linux kernel layer 204. During running, each app at the application program layer 201 may access, by invoking a related API at the framework layer 202, a device identifier such as an IMEI, an IMSI, an MEID, an SN, and a MAC address stored at the Linux kernel layer 204, and further performs related processing by using these device identifiers. For example, after obtaining an IMEI of a terminal, WeChat may encrypt a historical chat record of a user by using the IMEI, so as to prevent the historical chat record of the user from being leaked.

In addition, some applications obtain personal information of a user and a user behavior by accessing a device identifier such as an IMEI of a terminal, so as to facilitate establishment of a big database for pushing content related to the user. For example, identity information of the user is obtained based on the IMEI of the terminal, so that an advertisement is pushed based on the identity information of the user.

To be specific, for different applications, some device identifiers need to be used by the terminal during normal running, and some other device identifiers are used by an application to mark the terminal, so that a server on a network side uses the terminal as a sample for big data analysis. Access results of these device identifiers do not affect normal running of the application. However, when the terminal accesses these device identifiers, because the device identifier is directly associated with related information of the user, it is easy to cause user privacy leakage. As a result, device security of the terminal is compromised.

For this reason, in some embodiments of this application, to avoid a device security problem caused by access to a device identifier in the terminal by an application at will, corresponding device identifier access permission may be preset for each application in the terminal. An application A is used as an example. Access permission that is of a device identifier 1 and that is corresponding to the application A may specifically include whether the application A is allowed to access the device identifier 1. If the application A is allowed to access the device identifier 1, it may be further specified in the access permission that the device identifier 1 that is allowed to be accessed by the application A is specifically a real value or a dummy value of the device identifier 1. A dummy value of a device identifier is a virtual device identifier obtained after anonymization processing is performed on a real value of the device identifier. Related information of a user cannot be associated by using the virtual device identifier.

To be specific, the pre-stored access permission may provide, for an application without affecting normal running of the application, a real value of a device identifier that needs to be used when the application runs normally. When a device identifier requested by the application for access does not affect normal running of the application, a dummy value of the device identifier may be returned to the application, so as to minimize a privacy risk caused by excessive access of the device identifier by the application and improve device security of the terminal.

All the methods in the following embodiments may be implemented by a terminal that has the hardware shown in FIG. 6.

Figure 8:
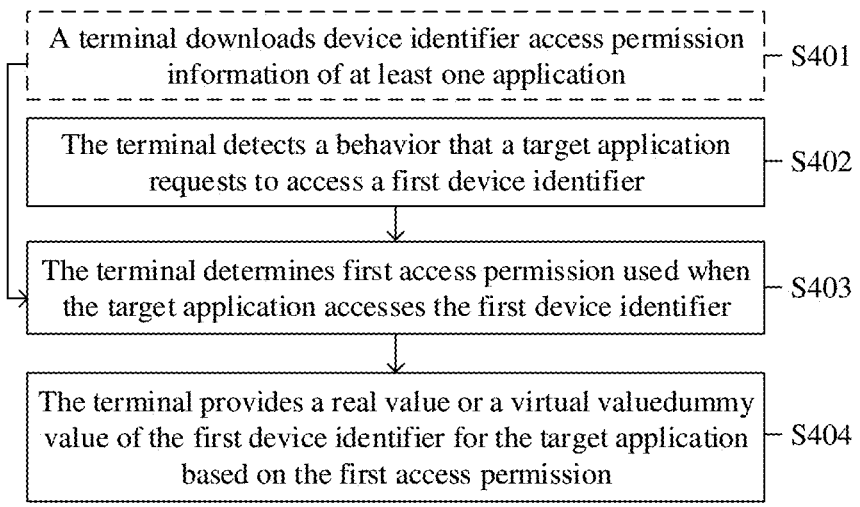
FIG. 8 is a schematic flowchart of a device identifier access method according to an embodiment of this application.

An embodiment of this application provides a device identifier access method. As shown in FIG. 8, the method may include the following steps.

Step S401: A terminal downloads device identifier access permission information of at least one application.

Specifically, a server on a network side may store the device identifier access permission information of the at least one application, and device identifier access permission information of each application includes access permission of at least two device identifiers. For example, the device identifier access permission information includes first access permission of a first device identifier and second access permission of a second device identifier. The first access permission is used to indicate whether the application is allowed to access the first device identifier, and whether a real value or a dummy value of the first device identifier is provided for the target application when the application is allowed to access the first device identifier. Similarly, the second access permission is used to indicate whether the application is allowed to access the second device identifier, and whether a real value or a dummy value of the second device identifier is provided for the target application when the application is allowed to access the second device identifier.

For device identifier access permission of any application, on a premise that the application can run normally, the access permission may ensure that a dummy value of the device identifier is provided for the application as far as possible, and a real value of the device identifier is hidden from the application as far as possible, so as to avoid a potential security risk of privacy leakage caused by overusing the real value of the device identifier by the application, and improve device security of the terminal.

For example, device identifiers accessed by an application A include an IMEI, an SN, and a MAC address. The SN is a device identifier that needs to be used when the application A runs on the terminal, and the IMEI and the MAC address are not device identifiers that need to be used when the application A runs on the terminal. In this case, permission that is generated on a permission management server 11 and that is for accessing the device identifier SN by the application A may be returning a real value, and permission for accessing the device identifier IMEI and the MAC address by the application A may be returning a dummy value.

Figure 9:
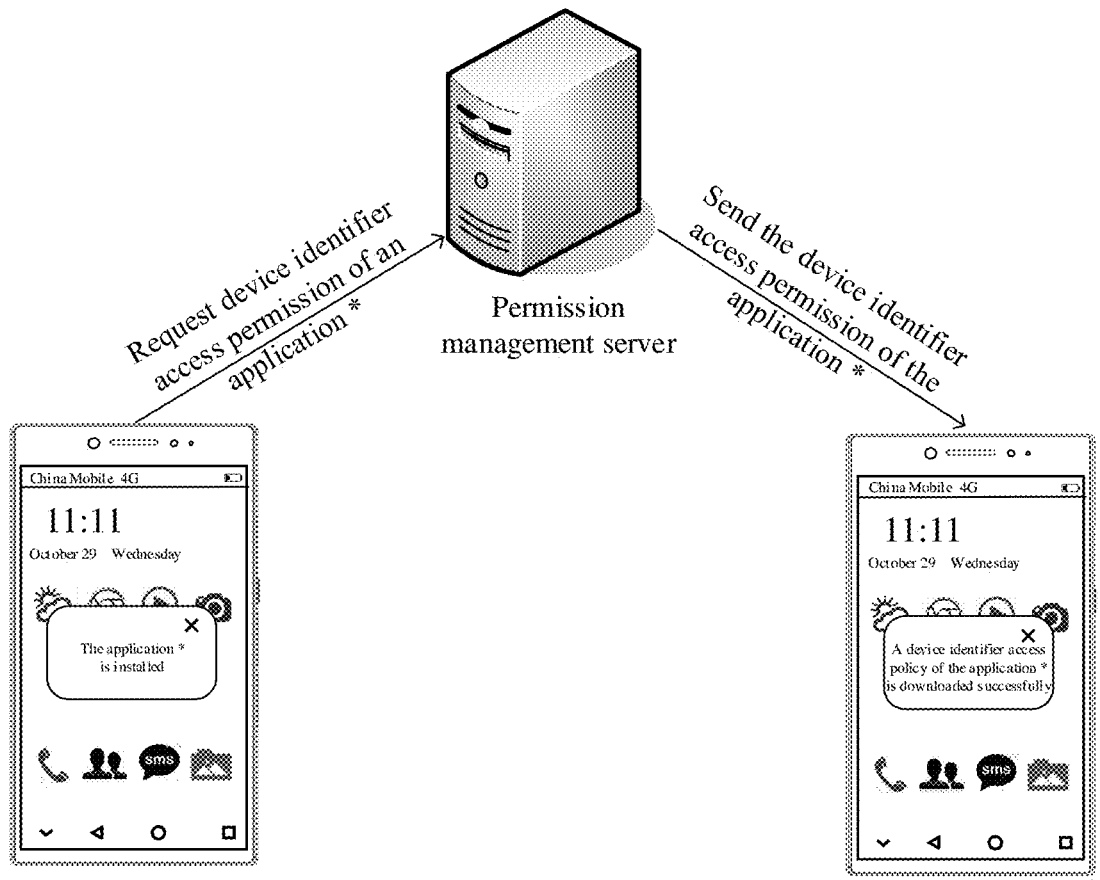
FIG. 9 is a schematic diagram 3 of an application scenario of a device identifier access method according to an embodiment of this application.

In some embodiments of this application, as shown in FIG. 9, each time a terminal is installing or has installed a new application, the terminal may be triggered to download, from the permission management server 11, device identifier access permission corresponding to the newly installed application to a memory of the terminal. Subsequently, the newly installed application may access a device identifier based on the downloaded device identifier permission when running on the terminal.

In other embodiments of this application, the terminal may determine device identifier access permission of a target application. For example, when downloading a new application, the terminal may obtain, from an application market, information such as a package name and a type of the new application being downloaded. Further, based on an application type to which the new application belongs, the terminal may store, in the memory, device identifier access permission of an installed application of a same type on the terminal, and use the device identifier access permission as device identifier access permission of the new application. In this way, when the new application subsequently requests to access the device identifier, the terminal does not need to obtain the device identifier access permission of the new application from the permission management server 11, and may return a real value or a dummy value of the device identifier to the new application in time based on the device identifier access permission that is of the new application and that has been stored in the terminal.

In other embodiments of this application, the terminal may also send, to the server, a request for obtaining device identifier access permission of at least one application, and the server searches, based on the request, the permission management server 11 for corresponding device identifier access permission, and delivers the device identifier access permission to the terminal.

In some other embodiments of this application, the terminal may further periodically download device identifier access permission of each application from the permission management server 11. A download time point and a specific download method of the device identifier access permission of each application are not limited in this embodiment of this application.

Step S402: The terminal detects a behavior that a target application requests to access a first device identifier.

During running, each application installed on the terminal can access a device identifier such as an IMEI, an IMSI, an MEID, an SN, and a MAC address by invoking a related identifier access function. For example, an application A may request to access the MEID by invoking a getMeid( ) function at a framework layer, and a return value of the function is a specific value of the MEID. The invoking behavior may be considered as a behavior of requesting to access the first device identifier.

Therefore, in step S402, when detecting that an application invokes an identifier access function (in this case, the application is the target application), the terminal may confirm a behavior that the target application requests to access the first device identifier corresponding to the identifier access function.

Step S403: The terminal determines first access permission used when the target application accesses the first device identifier.

After detecting the behavior that the target application requests to access the device identifier, unlike a behavior that an application accesses a real device identifier in the prior art, in step S403, the terminal may query, from a plurality of downloaded device identifiers in step S401, access permission (namely, the first access permission) corresponding to the target application, so as to subsequently access a related device identifier based on the first access permission.

In some embodiments of this application, as shown in FIG. 10, device identifier access permission of at least one application is stored in a terminal. Device identifier access permission of an application A is allowing the application A to access a real value of an MEID, and allowing the application A to access a dummy value of an SN and a MAC address. Device identifier access permission of an application B is allowing the application B to access dummy values of the MEID, the SN, and the MAC address. Device identifier access permission of an application C is prohibiting the application C from accessing the MEID, the SN, and the MAC address. In FIG. 10, descriptions are provided by using an example in which the MEID, the SN, and the MAC address are used as device identifiers.

In this case, in step S403, when the target application is ready to access the related device identifier, for example, when the application A invokes an identifier access function to access the MAC address, the terminal may search, in stored device identifier access permission shown in FIG. 10, for access permission (namely, the first access permission) used when the application A accesses the MAC address. The first access permission is allowing the application A to access a dummy value of the MAC address.

In other embodiments of this application, the terminal may further store, based on an application type, device identifier access permission corresponding to different application types. As shown in FIG. 11, an application in a terminal may be classified into an instant messaging application, a shopping application, and a game application based on an application type. Device identifier access permission of the instant messaging application is allowing the instant messaging application to access a real value of an IMEI, and allowing the instant messaging application to access a dummy value of an SN and a MAC address. Device identifier access permission of the shopping application is allowing the shopping application to access dummy values of the IMEI, the SN, and the MAC address. Device identifier access permission of the game application is prohibiting the game application from accessing the IMEI, the SN and the MAC address. In FIG. 11, descriptions are provided by using an example in which the IMEI, the SN, and the MAC address are used as device identifiers.

In this case, in step S403, when the target application is ready to access the related device identifier, for example, when an application A invokes an identifier access function to access the IMEI, the terminal may first determine a type of the application A. For example, the terminal may determine, based on a category of the application A in the application market when the application A is downloaded, that the type of the application A is an instant messaging application. Further, the terminal may search device identifier access permission shown in FIG. 11 for access permission (namely, the first access permission) for accessing the IMEI by the instant messaging application. The first access permission is allowing the instant messaging application to access the real value of the IMEI.

It should be noted that in FIG. 11, only an example of the instant messaging application, the shopping application, and the game application is used to describe the following: Device identifier access permission corresponding to different application types may be different. It may be understood that a person skilled in the art may classify the foregoing application types based on actual experience or an actual application scenario. For example, applications installed in a terminal are classified into two types of applications: an internal application provided in a system and an external application downloaded from a third-party platform. This is not limited in this embodiment of this application.

Alternatively, the terminal may further store access permission of device identifiers such as accounts of different applications, a telephone number of the terminal, or a phone number of a contact. For example, for a non-dialing application, because the phone number of the contact relates to privacy of a user, and the phone of the contact is usually not used when this type of application runs, access permission used when this type of application accesses the phone number of the contact may be set to accessing a dummy value of the phone number of the contact. However, for a dialing application, a dialing function cannot be implemented if the phone number of the contact is not provided for this type of application. Therefore, access permission used when this type of application accesses the phone number of the contact may be set to accessing a real value of the phone number of the contact.

In this way, when detecting a behavior that the target application requests to access the phone number of the contact, the terminal may determine, based on whether the target application belongs to a dialing application, whether to provide the real value of the phone number of the contact for the target application.

In addition, if the terminal does not find, in the downloaded device identifier access permission, device identifier access permission corresponding to the target application, the terminal may be triggered to download the device identifier access permission of the target application from the permission management server 11 on a network side. In this case, the terminal may request the permission management server 11 to deliver access permission of all device identifiers (including the first device identifier) related to the target application, or may request the permission management server 11 to deliver only access permission of a specific device identifier (for example, the first device identifier) that needs to be accessed by the target application in this case. This is not limited in this embodiment of this application.

Alternatively, if the terminal does not find, in the downloaded device identifier access permission, the device identifier access permission corresponding to the target application, the terminal may use device identifier access permission that is of a same type of application and that is in the downloaded device identifier access permission as the device identifier access permission of the target application based on a type of the target application (for example, a video application), so as to accelerate access to a device identifier by the target application.

Step S404: The terminal provides a real value or a dummy value of the device identifier for the target application based on the first access permission.

After the terminal obtains the first access permission corresponding to the target application, in step S404, if the target application is allowed to access the real value of the device identifier in the first access permission, the terminal may return the real value of the device identifier to the target application in the same way as in the prior art. If the target application is allowed to access the dummy value of the device identifier in the first access permission, the terminal may search a preset storage area to determine whether the dummy value of the device identifier is stored. If the dummy value of the device identifier is found, the dummy value is returned to the target application. If the dummy value of the device identifier is not found, the terminal may perform anonymization processing on the real value of the device identifier by using a randomized algorithm or a generalization algorithm, to obtain the dummy value of the device identifier and return the dummy value of the device identifier to the target application.

For example, the terminal may reserve a part of storage space in the storage area of the terminal to store a dummy value of each generated device identifier. In this case, for example, the MEID is a device identifier. The target application may request to access the MEID by invoking the getMeid( ) function. If the target application is allowed to access a dummy value of the MEID in the first access permission corresponding to the target application, the terminal may search the reserved storage space to determine whether the dummy value of the MEID is stored. If the dummy value of the MEID is not found, the terminal may perform anonymization processing on the real value of the MEID by using the randomized algorithm such as noise addition and permutation (or the generalization algorithm such as mask and truncation), to obtain the dummy value of the MEID. Further, the terminal may use the dummy value of the MEID as a return value of the getMeid( ) function invoked by the terminal, and returns the dummy value of the MEID to the target application.

Alternatively, the permission management server 11 may perform anonymization processing on the real value of the MEID by using the randomized algorithm (or the generalization algorithm) to obtain the dummy value of the MEID, and send the dummy value of the MEID to the terminal, so that the terminal can return the dummy value of the MEID to the target application.

For example, the target application requests to access the MEID of the terminal. When access permission of the MEID is not stored in the terminal, the terminal may send permission query request information to the permission management server, so as to request the permission management server 11 to send, to the terminal, the access permission used when the target application accesses the MEID. In this case, if the permission management server 11 finds the access permission used when the target application accesses the MEID, and the target application is allowed to access the dummy value of the MEID in the access permission, the target application may perform anonymization processing on the real value of the MEID when accessing the MEID, and send the obtained dummy value of the MEID to the terminal. In this way, the terminal does not need to perform anonymization processing on the real value of the MEID. After receiving the dummy value of the MEID sent by the permission management server 11, the terminal may use the dummy value as the function return value obtained when the target application requests to access the MEID, and return the return value to the target application.

In addition, the terminal may alternatively store the obtained dummy value of the MEID in the reserved storage space. In this way, when the target application or another application subsequently needs to access the dummy value of the MEID, the terminal may obtain the dummy value of the MEID from the reserved storage space and return the dummy value of the MEID to a corresponding application, so as to accelerate access to the MEID (namely, a device identifier).

Alternatively, in some other embodiments of this application, because the access permission used when the target application accesses the MEID is allowing the target application to access the dummy value of the MEID, each time the target application accesses the MEID, the terminal can perform anonymization processing on the real value of the MEID, so as to return obtained different dummy values of the MEID to the target application. In this way, an MEID value accessed by the target application is a dummy value. In addition, an MEID value accessed each time may be different. This further reduces a risk of user privacy leakage, and improves device security of the terminal.

For example, specific code for the target application to request to access the MEID by invoking the getMeid( ) function is as follows:

```
public String getMeid(int slotIndex){
        AppName = getOpPackageName( );//obtain the target application that invokes the getMeid( ) function
        result = getLocalPolicy(AppName,MEID); //search the terminal for the first access permission for accessing the MEID by the target application
        if(result ==NULL) Result= getCloudPolicy(AppName,MEID); //if there is no first access permission for accessing the MEID by the target application in the terminal, obtain the first access permission from the permission management server
        switch(result)
        {
            case TRUE://if the first access permission is returning the real value of the MEID
                return telephony.getMeidForSlot(slotIndex, getOpPackageName( ));//return the real value to the target application
            case FORBID://if the first access permission is prohibiting access to the MEID
                return "oooooooooooooooo"
            case MOCKED://if the first access permission is returning the dummy value of the MEID
                if (LocalMEID.exist( )) //If the dummy value of the MEID has been stored
                {
                    return readLocalMEID( );//read the dummy value of the MEID and return the dummy value to the target application
                }
                else //if the dummy value of the MEID is not stored
                {
                    return generateRandomMEID( );//generate a dummy value of the MEID, return the dummy value to the target application, and store the dummy value in the reserved storage area
                }
        }
}
```

When the terminal provides the dummy value of the MEID (namely, the device identifier) to the target application, the real value of the MEID is hidden from the target application. The dummy value does not affect normal running of the target application on the terminal, and a dummy value of a device identifier obtained by the target application is not directly associated with related information of a user. Therefore, a risk of privacy leakage caused by access to a device identifier by an application can be reduced, and device security of the terminal can be improved.

Figure 12:
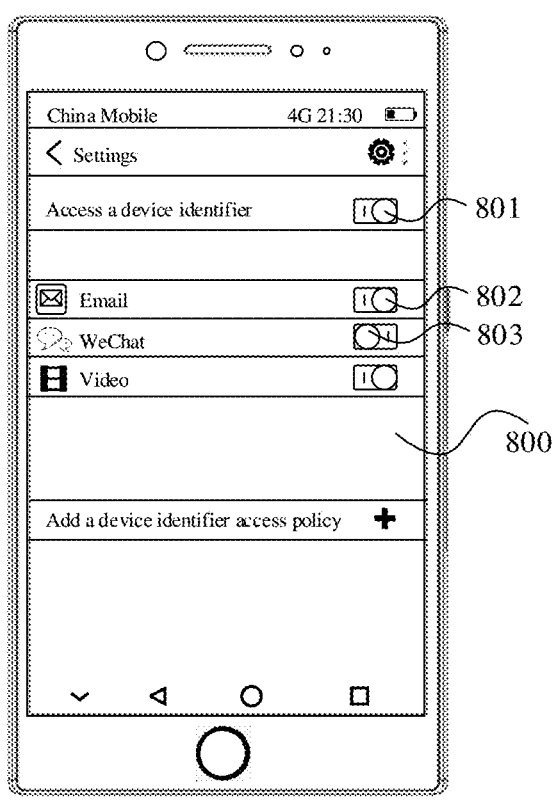
FIG. 12 is a schematic diagram 6 of an application scenario of a device identifier access method according to an embodiment of this application.

In some embodiments of this application, a user may further manually configure, on a setting screen of a terminal, an intelligent access function of the device identifier provided in the foregoing embodiments. For example, as shown in FIG. 12, after the user enables a control 801 of an intelligent access function of a device identifier on a setting screen 800, the user may manually disable or enable the intelligent access function of the device identifier for each application installed on the terminal. For example, as shown in FIG. 12, after the control 801 of the intelligent access function of the device identifier is enabled, a control 802 of a device identifier intelligently accessed by an email application may be enabled. In this case, when the email application subsequently requests to access a device identifier in the terminal, a real value or a dummy value of the device identifier may be intelligently provided for the email application according to the device identifier access method provided in the foregoing embodiments. The user manually disables a control 803 of a device identifier intelligently accessed by a WeChat application. Therefore, when the WeChat application subsequently requests to access a device identifier in the terminal, a real value of the device identifier may be provided for the Wechat application by following the prior art.

When the user manually disables or enables an intelligent access function that is of a device identifier and that is corresponding to an application, the terminal may send the manual configuration behavior of the user to a server on a network side, so that the server adjusts, in a timely manner based on different manual configuration behaviors of the user for the application, device identifier access permission corresponding to the application in a permission management server, thereby improving accuracy and practicability of the device identifier access permission.

Figure 13:
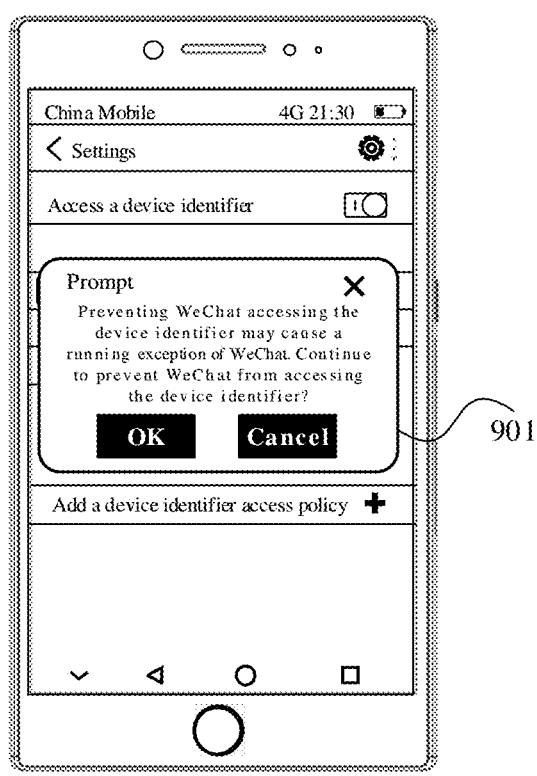
FIG. 13 is a schematic diagram 7 of an application scenario of a device identifier access method according to an embodiment of this application.

Alternatively, when the user manually disables or enables an intelligent access function that is of a device identifier and that is corresponding to an application, the terminal may alternatively evaluate whether this manual configuration behavior of the user affects normal running of the application. For example, a historical chat record generated in the WeChat application needs to be encrypted by using an IMEI. If a dummy value of the IMEI is returned to the WeChat application, the user may not view the historical chat record. Therefore, if the terminal detects that the user sets device identifier access permission used when the WeChat application accesses the IMEI to allowing the WeChat application to access the dummy value of the IMEI, as shown in FIG. 13, the terminal may prompt, by using a prompt method such as a dialog box 901, the user that the manual configuration affects normal running of the application, and reconfirms the manual configuration of the user, so as to avoid a problem such as a running exception caused by manual configuration of device identifier access permission by the user.

Figure 14:
FIG. 14 is a schematic diagram 8 of an application scenario of a device identifier access method according to an embodiment of this application.

In addition, in a process of downloading or installing a new application by the terminal, as shown in FIG. 14, a prompt method such as a dialog box 1001 may also be used to prompt the user whether to enable an intelligent access function of the device identifier described in steps 401 to 404 for the new application. If the user determines to enable the intelligent access function of the device identifier, in a subsequent process of running the new application, the device identifier of the terminal may be provided for the application according to the device identifier access method described in steps 401 to 404.

It can be understood that, to implement the foregoing functions, the terminal and the like include corresponding hardware structures and/or software modules for performing the functions. A person skilled in the art should easily be aware that, in combination with the example units, algorithms, and steps described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used.

Figure 15:
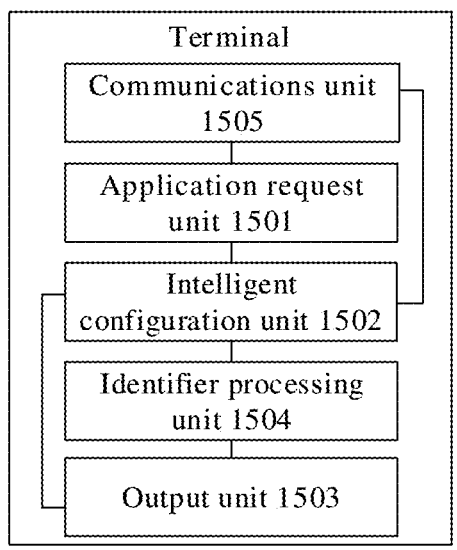
FIG. 15 is a schematic structural diagram 2 of a terminal according to an embodiment of this application.

When functional modules are divided by using corresponding functions, FIG. 15 shows a possible schematic structural diagram of the terminal in the foregoing embodiments. The terminal includes an application request unit 1501, an intelligent configuration unit 1502, an output unit 1503, an identifier processing unit 1504, and a communications unit 1505.

Figure 2:
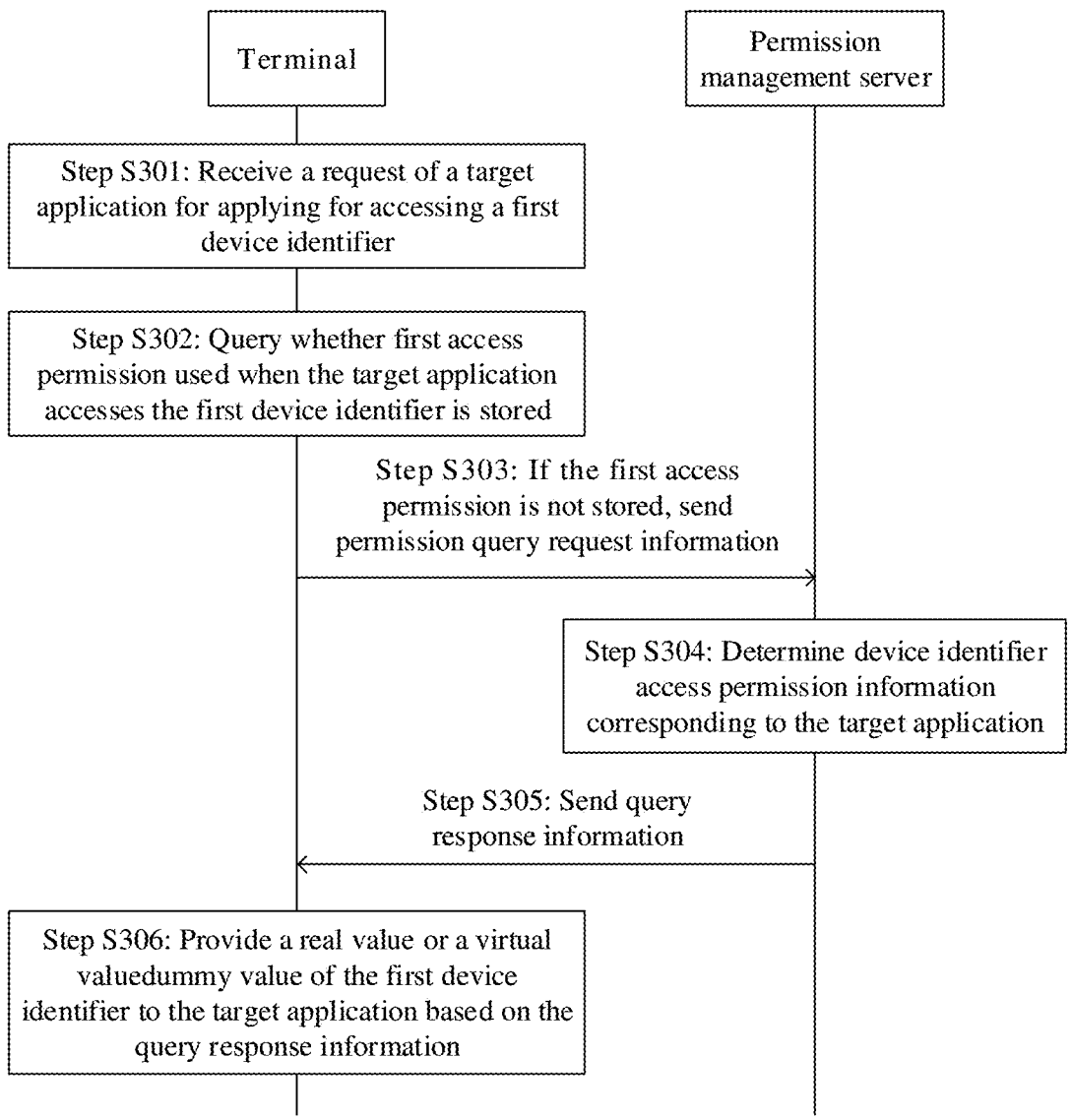
FIG. 2 is a schematic diagram of interaction in a device identifier access method according to an embodiment of this application.

The application request unit 1501 is configured to support the terminal to perform a process S301 in FIG. 2 and a process S402 in FIG. 8. The intelligent configuration unit 1502 is configured to support the terminal to perform a process S302 in FIG. 2 and a process S403 in FIG. 8. The output unit 1503 is configured to support the terminal to perform a process S306 in FIG. 2 and a process S404 in FIG. 8. The communications unit 1505 supports the terminal to perform processes S303 and S305 in FIG. 2 and a process S401 in FIG. 8. The identifier processing unit 1504 is configured to perform, by using a randomized algorithm or a generalization algorithm, anonymization processing on a real value of a device identifier requested by a target application, to obtain a dummy value of the device identifier. All content related to the steps in the foregoing method embodiments may be cited in function descriptions of corresponding functional modules. Details are not described herein.

When an integrated unit is used, the application request unit 1501, the intelligent configuration unit 1502, the output unit 1503, and the identifier processing unit 1504 may be integrated into a processing module, and the communications unit 1505 is used as a communications module, and the terminal may further include a storage module.

Figure 16:
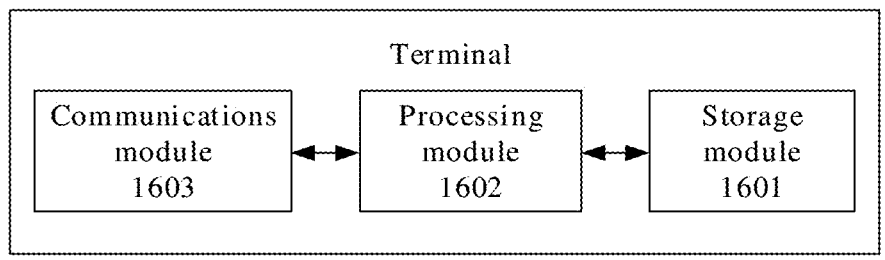
FIG. 16 is a schematic structural diagram 3 of a terminal according to an embodiment of this application.

In this case, FIG. 16 is a possible schematic structural diagram of a terminal in the foregoing embodiments. A processing module 1602 is configured to control and manage an action of the terminal. The communications module 1603 is configured to support the terminal to communicate with another network entity. A storage module 1601 is configured to store program code and data of the terminal.

For example, the processing module 1602 may be a processor or a controller, such as a central processing unit (Central Processing Unit, CPU), a GPU, a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communications module 1603 may be a transceiver, a transceiver circuit, an input/output device, a communications interface, or the like. For example, the communications module 1603 may be specifically a Bluetooth apparatus, a Wi-Fi apparatus, and a peripheral interface.

The storage module 1601 may be a memory. The memory may include a high-speed random access memory (RAM), and may further include a non-volatile memory, such as a disk storage device, a flash memory device, or another volatile solid-state storage device.

For example, when the processing module 1602 is a processor, the communications module 1603 is a radio frequency circuit, a Wi-Fi apparatus, and a Bluetooth apparatus, and the storage module 1601 is a memory, the terminal provided in this embodiment of this application may be the mobile phone 100 shown in FIG. 6.

Some embodiments of this application provide a terminal, including a touchscreen, where the touchscreen includes a touch-sensitive surface and a display screen, one or more processors, a memory, a plurality of application programs, and one or more computer programs. The one or more computer programs are stored in the memory. The one or more computer programs include an instruction. When the instruction is executed by the terminal, the terminal is enabled to perform the implementation solutions in FIG. 2 and FIG. 8.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
receiving, by a terminal, request information for accessing a first device identifier by a target application;
in response to the request information, determining, by the terminal, whether first access permission for the target application to access the first device identifier is stored;
in response to the terminal determining that the first access permission is not stored, sending, by the terminal, permission query request information to a permission management server through a wireless network, wherein the permission query request information comprises an identifier of the target application;
receiving, by the permission management server, the permission query request information;
determining, by the permission management server, whether device identifier access permission information of the target application is stored, wherein the device identifier access permission information comprises the first access permission and second access permission, the second access permission corresponds to the target application accessing a second device identifier;
in response to the permission management server determining that the device identifier access permission information of the target application is not stored, sending, by the permission management server, application type request information to an application server, wherein the application type request information comprises the identifier of the target application;
receiving, by the application server, the application type request information;
sending, by the application server, an application type corresponding to the target application to the permission management server;
setting, by the permission management server according to the application type, device identifier access permission information of a candidate application as the device identifier access permission information of the target application, wherein the candidate application has a same application type as the target application;
sending, by the permission management server, the device identifier access permission information of the target application to the terminal; and
in response to the first access permission in the device identifier access permission information of the terminal being allowing access to a dummy value of the first device identifier, returning, by the terminal, the dummy value of the first device identifier to the target application, wherein the dummy value of the first device identifier is obtained after anonymization processing is performed on a real value of the first device identifier.

2. The method according to claim 1, wherein:
before setting, by the permission management server, the device identifier access permission information of the candidate application as the device identifier access permission information of the target application, the method further comprises receiving, by the permission management server, behavior data from the terminal and obtained when a user uses the target application; and
after the setting, by the permission management server according to the application type, the device identifier access permission information of the candidate application as the device identifier access permission information of the target application, the method further comprises: modifying, by the permission management server, device identifier access permission of the target application according to the behavior data to obtain device identifier access permission corresponding to a user behavior.

3. The method according to claim 1, wherein the first device identifier comprises an international mobile equipment identity (IMEI), an international mobile subscriber identity IMSI, a mobile equipment identifier (MEID), a serial number (SN), a media access control layer (MAC) address, a phone number, or an application account.

4. A system, comprising:
a permission management server; and
a terminal connected to the permission management server through a wireless network;
wherein an application is installed on the terminal;
wherein the terminal is configured to:
  in response to a request for accessing a first device identifier by a target application being received, determine whether first access permission for the target application to access the first device identifier is stored in the terminal; and
  in response to the first access permission not being stored, send permission query request information to the permission management server, wherein the permission query request information comprises an identifier of the target application;
the permission management server is configured to:
  receive the permission query request information sent by the terminal;
  determine device identifier access permission information of the target application according to the identifier of the target application, wherein the device identifier access permission information comprises: the first access permission and second access permission, the second access permission corresponds to the target application accessing a second device identifier; and
  send query response information to the terminal, wherein the query response information comprises the device identifier access permission information of the target application; and
the terminal is further configured to:
  receive the query response information from the permission management server; and
  in response to the first access permission in the device identifier access permission information being allowing access to a dummy value of the first device identifier, return the dummy value of the first device identifier to the target application, wherein the dummy value of the first device identifier is obtained after anonymization processing is performed on a real value of the first device identifier.

5. The system according to claim 4, wherein returning the dummy value of the first device identifier to the target application comprises:
performing, by the terminal, anonymization processing on the real value of the first device identifier through a randomized algorithm or a generalization algorithm to obtain the dummy value of the first device identifier; and
returning, by the terminal, the dummy value of the first device identifier to the target application.

6. The system according to claim 5, wherein determining the device identifier access permission information of the target application according to the identifier of the target application comprises:
querying, by the permission management server according to the identifier of the target application, whether the permission management server stores the device identifier access permission information of the target application; and
in response to the device identifier access permission information of the target application not being stored, setting, by the permission management server, the device identifier access permission information of the target application according to a type of the target application.

7. The system according to claim 6, wherein:
the system further comprises an operation server connected to the permission management server and of an application market; and
setting, by the permission management server, the device identifier access permission information of the target application according to the type of the target application comprises:
  obtaining, by the permission management server, the type of the target application from the operation server; and
  setting, by the permission management server, device identifier access permission information of an application the device identifier access permission information of the target application, the application is on the permission management server and has a same type as the target application.

8. The system according to claim 4, wherein the permission management server is further configured to:
receive behavior data reported by the terminal and obtained when a user uses the target application; and
set, for the terminal according to the behavior data obtained when the target application is used, device identifier access permission information of the target application that conforms to a user behavior.

9. The system according to claim 4, wherein:
the first device identifier comprises a low-risk device identifier and a high-risk device identifier, and interference generated by the low-risk device identifier when the target application runs is less than interference generated by the high-risk device identifier when the target application runs;
access permission of the low-risk device identifier is accessing a dummy value of the low-risk device identifier; and
access permission of the high-risk device identifier is accessing a real value of the low-risk device identifier.

10. An terminal, comprising:
a display;
one or more processors; and
a non-transitory memory for storing instructions which, when executed by the one or more processors, cause the terminal to:
  receive request information for accessing a first device identifier by a target application;
  in response to the request information, determine first access permission corresponding to the target application accessing the first device identifier, wherein the first access permission comprises prohibiting access to the first device identifier, allowing access to a real value of the first device identifier, or allowing access to a dummy value of the first device identifier; and
  return the dummy value of the first device identifier to the target application in response to the first access permission allowing access to the dummy value of the first device identifier, wherein the dummy value of the first device identifier is obtained after anonymization processing is performed on the real value of the first device identifier.

11. The terminal according to claim 10, wherein the instructions further cause the terminal to:
select according to a name of the target application, access permission corresponding to the name of the target application in the terminal as the first access permission used in response to the target application accessing the first device identifier.

12. The terminal according to claim 10, wherein instructions further cause the terminal to:
select, according to a type of the target application, access permission corresponding to the type of the target application in the terminal as the first access permission used in response to the target application accessing the first device identifier.

13. The terminal according to claim 10, wherein instructions further cause the terminal to:
query whether the dummy value of the first device identifier is stored; and
return the dummy value of the first device identifier to the target application in response to the dummy value of the first device identifier being stored.

14. The terminal according to claim 13, wherein the instructions further cause the terminal to:
in response to the dummy value of the first device identifier not being stored, perform anonymization processing on the real value of the first device identifier through a randomized algorithm or a generalization algorithm, to obtain the dummy value of the first device identifier; and
return the dummy value of the first device identifier to the target application.

15. The terminal according to claim 10, wherein the instructions further cause the terminal to:
send permission query request information to a permission management server through a wireless network, wherein the permission query request information comprises an identifier of the target application; and
receive permission query response information from the permission management server, wherein the permission query response information comprises device identifier access permission information of the target application, and the device identifier access permission information comprises the first access permission and second access permission, the second access permission corresponds to the target application accessing a second device identifier.

16. The terminal according to claim 10, wherein the instructions further cause the terminal to:
use access permission used when a candidate application accesses the first device identifier as the first access permission used when the target application accesses the first device identifier, wherein a type of the candidate application is the same as the type of the target application.

17. The terminal according to claim 10, wherein:
the first device identifier comprises an international mobile equipment identity, an international mobile subscriber identity, a mobile equipment identifier, a serial number, or a media access control layer address;
the terminal stores the dummy value of the first device identifier; or
in response to detecting that the target application invokes a preset identifier access function, the instructions further cause the terminal to determine to receive the request information for accessing the first device identifier by the target application.

* * * * *